United States Patent Office 3,252,802
Patented May 24, 1966

3,252,802
METHOD OF SUPPLEMENTING THE FEED OF GROWING SWINE WITH NICOTINE
Hugh M. Cunningham, Nappan, Nova Scotia, Canada, assignor to Canadian Patents and Development Limited, Ottawa, Ontario, Canada
No Drawing. Filed June 11, 1964, Ser. No. 374,265
3 Claims. (Cl. 99—2)

This invention relates to a feed supplement for animals, particularly pigs, and more particularly to a feed supplement whose oral administration will increase the ratio of protein to fat deposited in the carcasses of growing pigs, will increase feed efficiency under some conditions in pigs.

For reasons believed obvious attempts are being made continuously to increase the in-carcass protein to fat ratio and the feed efficiency of pigs. Limited success has been achieved in this regard by increasing protein content in pig-feed and/or by restricting the amount of pig-feed given daily. However, it has been found that increasing the protein content of feed increases the cost of the feed and thereby increases the cost of production of bacon and also still results in a carcass which is quite high in fat content. Restricting the feed intake of pigs increases the time required for the pigs to reach a marketable weight and also either requires expensive feed metering devices or extra labour with its attendant increase in cost.

Increased leanness, that is increased protein to fat ratio may also be achieved to some extent by including fibrous feeds in the pig's rations but this has been found to lead normally to a decrease in feed efficiency.

Thus to date no completely successful way is known to increase the protein to fat ratio in the carcasses of growing pigs and/or to increase feed efficiency without an attendant substantial increase in costs which increase must result in either a lower profit margin for the marketer or an increase in pork costs to the consumer.

It is an object of this invention to provide an animal feed supplement whose proper administration to pigs under suitable conditions will result in an increase in protein to fat ratio and usually an increase in the feed efficiency of growing pigs. As a result of utilizing the animal-feed supplement according to this invention the general carcass quality of pigs will also be improved.

It has been discovered that surprisingly the use of nicotine or an ingestable salt of nicotine such as nicotine sulphate, nicotine hydrochloride, nicotine dihydrochloride, nicotine phosphate and nicotine tartrate at certain levels as an animal-feed supplement will increase the ratio of protein to fat deposited in the carcass of growing pigs and in many instances will at the same time increase feed efficiency. Increases of up to 17% in the ratio of protein to fat deposited in carcasses and feed efficiency increases of up to 5% have been achieved as will be shown hereinbelow.

The level of nicotine used in the animal-feed is normally from about 1.54 mg. to about 192.5 mg. and preferably from about 3.85 mg. to about 38.5 mg. of nicotine per kg. of animal-feed expressed as nicotine, which is substantially equal to from about 2 mg. to about 250 mg. and preferably from about 5 mg. to about 50 mg. per kg. of animal-feed expressed as nicotine sulphate, nicotine sulphate being approximately 76.78% nicotine. The broad range of nicotine sulphate noted amounts to approximately 0.134 to 16.73 mg. per kg. of body weight per day when administered to pigs. Obviously the lower the level of nicotine or its salts which can be used per kg. of feed, the cheaper will be the final costs of utilizing this feed supplement and hence it will normally be advantageous to use as low an amount of nicotine as possible. Also the nicotine or its salts used should be such as to be readily incorporated in an easy manner into some part of the daily ration of a pig, that is ether in the feed or in the drinking water or in some other carrier suitable for oral administration.

As indicated nicotine or an ingestable salt of nicotine can be utilized with nicotine sulphate $$[(C_{10}H_{14}N_2)_2 \cdot H_2SO_4]$$

having been found particularly useful because of its ready solubility in water, its commercial availability as "Black-Leaf 40" which is a preparation containing 40% nicotine sulphate and normally utilized at this high concentration as a vermifuge and its relatively low volatility as compared with nicotine. If nicotine is used a suitable carrier which reduces its volatility should be employed such as a vegetable oil in which it is soluble, or bentonite. Such a masterbatch can then be worked into the feed when most feasible.

Normally if nicotine sulphate is utilized it will be dissolved in water and can be worked into the animal-feed in the required concentration with any known feed being employed as a carrier. Pig-feed utilized should preferably be one which is high in protein content.

Two examples of pig-feed compositions which have been utilized in accordance with present invention are noted hereinbelow in Table I.

*Table I*

BASIC PIG-FEED COMPOSITION

| Ration Component | Ration 1, kg. | Ration 2, kg. |
|---|---|---|
| Ground barley | 78.27 | 88.15 |
| Soybean oil meal | 10.00 | 4.50 |
| Meat scraps (55% protein) | 5.00 | |
| Fishmeal (65% protein) | 5.00 | 5.50 |
| Iodized salt | .50 | .50 |
| Antibiotic [a] | | .05 |
| Dicalcium phosphate | | .25 |
| Ground limestone | 1.00 | .80 |
| Vitamin A and D [b] | .20 | .15 |
| Vitamin $B_{12}$ [c] | | .05 |
| Zinc sulphate | .03 | .05 |
| Composition: | Percent | Percent |
| Dry matter | 89.29 | 87.76 |
| Protein | 20.25 | 16.49 |

[a] Contained 10 gm. of chlortetracycline per pound.
[b] Dry supplement containing 1500 I.U. of vitamin A and 300 I.U. of vitamin $D_3$ per gm.
[c] Contained 9 mg. of vitamin $B_{12}$ per pound.

It has been found that the advantages of the invention can be achieved when the nicotine or its salt is fed, mixed into the feed, under either ad-libitum or restricted feeding conditions. However, when pigs were fed the same amount of feed per day (paired data) those receiving nicotine sulphate grew at a faster rate than controls and stored more protein in relation to fat. When pigs were fed ad-libitum those fed nicotine grew at the same rate as the controls, consuming less feed but storing more protein and less fat in their carcasses. Thus no matter which procedure was utilized, improvement in carcass quality resulted and additionally under certain conditions improvement in feed efficiency and growth rate was obtained.

The theory whereby the results of the present invention are achieved is believed to be that the nicotine or its derivative rather than acting directly on the animal's body functions, stimulates the release of a natural hormone of the body, epinephrine, which in turn exerts the desirable effects on the carcass, that is the epinephrine stimulates protein synthesis as indicated by the retention of more nitrogen in the animal's body than would otherwise be retained.

The following examples are given to illustrate this invention without being intended to limit its scope which is as defined in the appended claims.

EXAMPLE 1

Eight Yorkshire barrows weighing approximately 65 kg. were placed in individual tared metal digestion cages. Each pig received 200 gm. of water and 800 gm. of a 20% protein ration (ration 1, Table I) twice daily. After one week the pigs were allotted into two groups of equal weight. One group continued to receive ration 1 while the other group was fed the same ration supplemented with 50, 100 and 250 mg. of nicotine sulphate (Black-Leaf 40) per kg. of feed during three successive periods of two, two and one week's duration, respectively. The nicotine sulphate for each ration was dissolved in 50 ml. of water and premixed with a small amount of feed before final mixing. The rations in all experiments were stored in polyethylene bags to reduce nicotine sulphate evaporation. A seven-day nitrogen balance was obtained with each pig during each week of the experiment. Urine was collected in sufficient hydrochloric acid (HCl) to maintain an acid pH. Feces were collected twice daily, placed in polyethylene bags and frozen. The feces were later partially thawed, weighed, mixed in a bowl-type Hobart mixer and analyzed for dry matter. 10 gm. samples of wet feces and of urine were analyzed for nitrogen by the Kjeldahl procedure. The results are set out in Table II below.

*Table II*

AVERAGES AND STANDARD ERRORS OF WEIGHT GAIN, NITROGEN BALANCE, URINE VOLUME AND DIGESTIBILITY COEFFICIENTS IN EXAMPLE 1

| Item | Controls | Nicotine | Difference, percent |
| --- | --- | --- | --- |
| No. of pigs | 4 | 4 | |
| Initial weight, kg | 81.0 | 79.9 | |
| Feed per day, gm | 1,600 | 1,600 | |
| Daily gain (35 days), gm | 192±18 | 202±6 | 5.2 |
| Daily N balance, gm.: | | | |
| Period 1 (50 mg.)[a] | 12.5±.80 | 13.4±.15 | 7.2 |
| Period 2 (50 mg.) | 12.1±.33 | 13.9±.25 | 14.9 |
| Period 3 (100 mg.) | 12.5±.41 | 13.0±.37 | 4.0 |
| Period 4 (100 mg.) | 12.1±.65 | 12.0±.29 | −0.8 |
| Period 5 (250 mg.) | 9.9±.77 | 11.0±.35 | 11.1 |
| Av | 11.8 | [b] 12.7 | 7.6 |
| Dry matter digestibility, percent | 81.1±.13 | 81.0±.20 | −0.1 |
| Protein digestibility, percent | 85.2±.27 | 85.3±.34 | 0.1 |
| Urine volume per day, kg | 3.15±.02 | 3.06±.04 | −2.9 |

[a] Levels of 50, 100 and 250 mg. of nicotine sulphate per kg. of ration. These were approximately equivalent to 1, 2 and 5 mg. per kg. of body weight per day.
[b] P <.01, from analysis of variance.

From these results it will be noted that the oral administration of nicotine sulphate at all levels of supplementation resulted in increased nitrogen retention during the first three weeks which indicates increases in in-carcass protein synthesis. There was little difference in nitrogen retention between the control and nicotine groups after three weeks except in period five where a high level of nicotine sulphate (250 mg. per kg. of food) resulted in greater retention. The increase in nitrogen retention resulting from the use of nicotine sulphate was statistically significant over the five periods. Use of nicotine sulphate resulted in an average increase in body weight gain over controls of 5.2%. There was little difference between treatments in the digestibility of protein or dry matter but the average daily urine volume was slightly lower in the group receiving nicotine sulphate.

EXAMPLE 2

Example 1 was repeated with an additional eight barrows of the same weight except that levels of 25, 50 and 12.5 mg. of nicotine sulphate per kg. of feed (ration 2, Table I) were tested during three successive periods of three, two and two weeks' duration respectively. Nitrogen balances were obtained during each week of the experiment and one 24-hour determination of carbon dioxide production was obtained on each pig for each level of nicotine supplementation. The results are set out in Table III below.

*Table III*

AVERAGES AND STANDARD ERRORS OF WEIGHT GAIN, NITROGEN BALANCE, CARBON BALANCE, URINE VOLUME AND DIGESTIBILITY COEFFICIENTS IN EXAMPLE 2

| Item | Controls | Nicotine | Difference, percent |
| --- | --- | --- | --- |
| No. of pigs | 4 | 4 | |
| Initial weight, kg | 69.4 | 70.2 | |
| Feed per day, gm | 1,600 | 1,600 | |
| Daily gain (49 days), gm | 335±7 | 362±10 | 8.1 |
| Daily N balance, gm.: | | | |
| Period 1 (25 mg.)[a] | 12.7±.78 | 14.2±.30 | 11.8 |
| Period 2 (25 mg.) | 13.4±.30 | 13.7±.46 | 2.2 |
| Period 3 (25 mg.) | 13.2±.97 | 13.6±.35 | 3.0 |
| Period 4 (50 mg.) | 12.9±.81 | 12.3±1.04 | −4.7 |
| Period 5 (50 mg.) | 13.7±.39 | 13.5±.43 | −1.5 |
| Period 6 (12.5 mg.) | 13.4±.83 | 12.9±.92 | −3.7 |
| Period 7 (12.5 mg.) | 13.2±.37 | 13.6±.66 | 3.0 |
| Av | 13.2 | 13.4 | 1.5 |
| Dry matter dig., percent | 81.7±.17 | 81.9±.16 | 0.2 |
| Protein dig., percent | 82.9±.37 | 84.0±.30 | 1.3 |
| Urine volume per day, kg | 2.36±.02 | 2.31±.02 | −2.1 |
| Daily carbon intake, gm | 627.7 | 627.7 | |
| Expired carbon per day, gm.:[b] | | | |
| (25 mg.) | 362.3±14.5 | 362.8±11.2 | |
| (50 mg.) | 346.7±15.4 | 344.1±10.5 | |
| (12.5 mg.) | 335.0±11.7 | 335.5±11.3 | |
| Feces and urine carbon, gm. | | | |
| (25 mg.) | 133.7±1.9 | 131.6±2.2 | |
| (50 mg.) | 131.7±1.6 | 132.6±6.4 | |
| (12.5 mg.) | 125.5±2.2 | 126.2±3.0 | |
| Protein carbon stored per day, gm.: | | | |
| (25 mg.) | 43.6±1.8 | 44.5±1.3 | |
| (50 mg.) | 43.5±1.3 | 39.5±3.0 | |
| (12.5 mg.) | 43.4±2.3 | 41.9±3.1 | |
| Carbon balance stored as fat:[c] | | | |
| (25 mg.) | 88.1±16.4 | 88.8±11.9 | |
| (50 mg.) | 105.8±15.3 | 111.5±14.6 | |
| (12.5 mg.) | 123.8±12.7 | 124.0±8.2 | |

[a] Nicotine sulphate per kg. of ration.
[b] Each figure is the average carbon content of air expired over a 24 hr. period by four pigs. One determination was made on each pig at each level of supplementation with individual determinations made on two pigs from each group during each period from period 2 through period 7.
[c] Carbon balance equals carbon intake−(expired carbon+feces and urine carbon+carbon stored as protein) and mainly represents carbon stored as fat.

Results indicate that nicotine sulphate at all levels of supplementation resulted in increased nitrogen retention during the first three weeks thus indicating increased in-carcass protein synthesis. After the first three weeks there was little difference in nitrogen retention between the controls and nicotine sulphate groups. The increase in nitrogen retention resulting from the use of nicotine sulphate was statistically significant over the first three periods and the use of nicotine sulphate resulted in an average increase in body weight gain over controls of 8.1%. There was little difference between treatments in the digestibility of protein or dry matter but the average daily urine volume was slightly lower in the group receiving nicotine sulphate.

The use of nicotine sulphate has no significant effect on carbon balance indicating no net change in fat storage. The carbon retained as fat increased in both groups as the experiment progressed. Part of this change resulted from a 2% increase (significant at P<.01) in dry matter digestibility and was reflected in a reduced excretion of feces and urine carbon. Much of the change resulted from a decrease in the average figures for expired carbon and could largely be attributed to two pigs in each group which expired less carbon dioxide in each succeeding period.

EXAMPLE 3

This example shows changes in nitrogen retention when only one level of nicotine sulphate is used over an extended period of time. Four barrows were used as controls and four received 25 mg. of nicotine sulphate per kg. of feed (ration 2, Table I). Successive seven-day nitrogen balances were obtained with each pig over a period of six weeks and otherwise procedures noted in Example 1 were utilized. Results were as follows:

*Table IV*

AVERAGES AND STANDARD ERRORS OF WEIGHT GAIN, NITROGEN BALANCE, URINE VOLUME AND DIGESTIBILITY COEFFICIENTS IN EXAMPLE 3

| Item | Controls | Nicotine [a] | Difference, percent |
|---|---|---|---|
| No. of pigs | 4 | 4 | |
| Initial weight, kg | 67.7 | 67.3 | |
| Feed per day, gm | 1,600 | 1,600 | |
| Daily gain (42 days) | 431±10 | 419±4 | −2.8 |
| Daily N balance, gm.: | | | |
| Period 1 | 12.2± .45 | 13.3±1.10 | 9.0 |
| Period 2 | 11.6± .66 | 13.3± .67 | 14.7 |
| Period 3 | 12.5± .73 | 12.9± .83 | 3.2 |
| Period 4 | 13.1±1.01 | 13.0± .60 | −0.8 |
| Period 5 | 12.9± .93 | 12.8± .66 | −0.8 |
| Period 6 | 13.4± .83 | 13.4± .84 | 0.0 |
| Av | 12.6 | 13.1 | 4.0 |
| Dry matter dig., percent | 80.8± .20 | 80.7± .22 | −0.1 |
| Protein dig., percent | 85.5± .42 | 85.3± .38 | −0.2 |
| Urine volume per day, kg | 3.08±.04 | 2.98±.03 | −3.2 |

[a] All pigs in nicotine group were fed 25 mg. nicotine sulphate per kg. of feed in all periods.

In this example as in Examples 1 and 2 the use of nicotine sulphate resulted in increased nitrogen retention during the first three weeks. The increase in nitrogen retention resulting from the use of nicotine sulphate was statistically significant over the first three periods of the examples. Although not believed of any significance, the average increase in body weight was less in those pigs fed nicotine sulphate than in those not so fed by 2.8%. There was little difference between treatments in the digestibility of protein or dry matter although again the average daily urine volume in all experiments was slightly lower in the group receiving the nicotine sulphate.

EXAMPLE 4

This example was carried out to determine the effect of the oral administration of nicotine sulphate on growth weight, feed efficiency and carcass composition of pigs under conditions of ad-libitum feeding. Twenty barrows and twenty gilts averaging 24 kg. in body weight were removed in lots of four from litters that contained either four males or four females within a weight range of 4 kg. Nicotine sulphate was incorporated into ration 2, Table I, at levels of 0, 5, 10 and 20 mg. per kg. and each pig in each lot was individually self-fed at one of these levels. Each pig was marketed when its body weight, determined weekly, exceeded 87 kg. All pigs were fed the control ration containing no nicotine for 24 hours before slaughter in order to ensure a safe nicotine level in the carcass to permit sale to a packer. Chilled carcasses were graded and scored according to standard procedures (1959, National Bacon Hog Policy, Record of Performance in Advanced Registry for Pure Bred Pigs, Production Service, Canadian Department of Agriculture, Ottawa, Canada). One-half of each carcass (packer style) was frozen, weighed and finely minced in a machine (Cunningham et al., Canadian Journal of Animal Science, 41: 158, 1961). The minced tissue from each pig was placed in a plastic bag, allowed to thaw at room temperature, thoroughly mixed in a large bowl-type Hobart mixer and sampled. Samples were analyzed for dry matter, nitrogen and ash by standard procedures. Fat was determined by a modification of the Saxon procedure for feces (Hawk et al., 1947) in which 2 gm. samples were shaken before extraction with 8 ml. of a solution containing 5 volumes of water to 3 of concentrated hydrochloric acid (HCl). The results are noted in Table V below.

*Table V*

EFFECTS OF GRADED LEVELS OF NICOTINE ON AVERAGE GROWTH RATE. FEED EFFICIENCY AND CARCASS COMPOSITION OF GROWING PIGS IN EXAMPLE 4

| | Level of nicotine in the ration [a] (mg./kg.) | | | | Standard error |
|---|---|---|---|---|---|
| | 0 | 5 | 10 | 20 | |
| No of pigs | 10 | 10 | 10 | 10 | |
| Initial body weight, kg. | 23.4 | 23.4 | 23.6 | 23.2 | |
| Days on test | 84.0 | 86.8 | 84.0 | 84.7 | |
| Daily gain, gm | 779 | 743 | 775 | 786 | ±19 |
| Carcass weight, kg | 68.1 | 69.1 | 68.6 | 70.4 | ±.53 |
| Dressing percentage | 77.4 | *78.7 | *78.3 | *78.6 | ±.51 |
| Wt. gain per kg. feed, gm | 284 | 291 | 290 | 288 | ±7 |
| Carcass gain per kg. feed, gm.[b] | 222 | 234 | 231 | 230 | ±5 |
| Depth of back and loin fat, in | 1.57 | *1.50 | 1.53 | 1.59 | ±.03 |
| Loin eye area, in | 3.63 | 3.74 | 3.57 | *3.84 | ±.08 |
| Carcass length, in | 30.04 | *31.1 | *30.8 | *30.8 | ±.11 |
| Carcass score | 62.3 | *70.6 | 67.4 | 63.6 | ±2.8 |
| Carcass grade, A, B, C, resp | 6,4,0 | 7,3,0 | 4,5,1 | 4,6,0 | |
| Carcass analyses: | | | | | |
| Dry matter | 57.17 | *54.08 | 55.86 | 55.54 | ±.60 |
| Protein | 14.69 | *15.47 | *15.36 | *15.37 | ±.17 |
| Fat [c] | 39.23 | †35.26 | *37.36 | †36.80 | ±.74 |
| Ash | 3.25 | 3.34 | 3.34 | 3.36 | ±.06 |

[a] Levels of 0, 5, 10 and 20 mg. per kg. of feed in this experiment were approximately equivalent to 0, .33, .67, and 1.33 mg. per kg. of body weight per day.
[b] Calculated by assuming an initial dressing percentage of 75% in weanling pigs at the beginning of the experiment.
[c] Fat was determined "by difference."

*P <.05 using the Student-Newman, Keul method (Federer, 1955).
†P <.01.

These results show that significant improvements in carcass quality were obtained at all levels of nicotine sulphate supplementation with the greatest differences apparent at the lowest level. This level (5 mg. per kg. of feed) resulted in an average decrease of 10% in the fat content of the carcasses and a 5.3% increase in the protein content. There were also significant improvements in dressing percentage, area of loin, depth of back fat, carcass length, and ROP (record of performance) carcass score. With respect to depth of back fat it should be noted that the figures in the table are significant if carcass weight is considered. Rate of gain and feed efficiency were not significantly influenced by the level of nicotine sulphate supplementation but there was greater feed efficiency in all groups fed nicotine sulphate with a maximum increase of 5.4% in the carcass gain: feed level at the lowest level of nicotine sulphate. The pigs in group four not only had a significantly higher dressing percentage than the controls but their average market weight was 0.9 kg. greater. This resulted in carcasses which averaged 2.3 kg. heavier than those of the controls allowing them to have a slightly greater depth of back fat and yet a significantly lower percentage of chemically determined carcass fat. It is also believed probable that fat on other parts of the carcass was reduced to give the significant differences in carcass fat.

In summary it has been shown that the effects of the oral administration of nicotine or a nicotine salt and in particular nicotine sulphate, on protein and fat deposition in pigs are favourable in that under conditions of restricted feeding 70 to 80 kg. pigs fed 12.5 to 250 mg. of nicotine sulphate per kg. of feed retained significantly more nitrogen than controls although there was no appreciable difference in fat deposition indicating increase in protein synthesis. Even more significant is the fact that weanling pigs fed ad-libitum until market weight on rations containing 5, 10 and 20 mg. of nicotine sulphate per kg. of feed showed significant improvements over controls in dressing percentage, depth of back fat, area of loin, carcass length, carcass score, carcass protein and carcass fat. On the average greatest differences were observed at the 5 mg. per kg. of feed level of nicotine sulphate in which there was a 17% increase in carcass protein:fat ratio.

I claim:

1. A method of increasing the protein to fat ratio in growing swine without adversely affecting the feed efficiency which comprises administering orally to the growing swine a compound selected from the group consisting of nicotine and ingestable salts of nicotine selected from the group consisting of nicotine sulphate, nicotine phosphate, nicotine hydrochloride, nicotine dihydrochloride and nicotine tartrate, in an amount of between about 1.54 mg. and about 38.5 mg. of said compound expressed as nicotine per kg. of animal feed fed to the growing swine.

2. The method of claim 1 wherein the nicotine compound is nicotine sulphate.

3. The method of claim 1 wherein the amount is about 5 mg. per kg. of animal feed.

References Cited by the Examiner

UNITED STATES PATENTS

| | | | |
|---|---|---|---|
| 2,027,967 | 1/1936 | Elmslie et al. | 167—53 |
| 2,428,444 | 10/1947 | Whiting | 167—53 |
| 2,974,043 | 3/1961 | Hockberg et al. | 99—4 |
| 3,011,944 | 12/1961 | Yamashita | 99—2 |

OTHER REFERENCES

Chemical Abstracts, vol. 22, page 3435, citing American J. Physiol. 81, p. 469 (1927).

Gregory: Uses and Applications of Chemicals and Related Materials, vol. 2. Reinhold Publishing Corp., N.Y., 1944 (p. 233 relied on).

Price, Jack D.: "The Status of Medicated Feed," Feedstuffs, pp. 85, 86, Oct. 4, 1958.

Rose et al.: The Condensed Chemical Dictionary, Reinhold Publishing Corp., N.Y., 1956 (pp. 774, 775 relied on).

A. LOUIS MONACELL, *Primary Examiner.*

D. DONOVAN, *Assistant Examiner.*